(12) United States Patent
Nilsson

(10) Patent No.: US 6,532,892 B1
(45) Date of Patent: Mar. 18, 2003

(54) METHOD AND APPARATUS FOR RECOGNIZING AND DETERMINING A POSITION AND ROBOT INCLUDING SUCH AN APPARATUS

(75) Inventor: Mats Nilsson, Tumba (SE)

(73) Assignee: Delaval Holding AB, Tumba (SE)

(*) Notice: Subject to any disclaimer, the term of this patent is extended or adjusted under 35 U.S.C. 154(b) by 0 days.

(21) Appl. No.: 09/959,287
(22) PCT Filed: Apr. 5, 2000
(86) PCT No.: PCT/SE00/00652
§ 371 (c)(1),
(2), (4) Date: Oct. 19, 2001
(87) PCT Pub. No.: WO00/62602
PCT Pub. Date: Oct. 26, 2000

(30) Foreign Application Priority Data

Apr. 16, 1999 (SE) ............................. 9901385-6

(51) Int. Cl.[7] ............................. A01J 3/00; A01J 5/00
(52) U.S. Cl. ............................. 119/14.03; 119/14.08
(58) Field of Search ............................. 119/14.01, 14.03, 119/14.08, 14.18

(56) References Cited

U.S. PATENT DOCUMENTS

| | | | | |
|---|---|---|---|---|
| 5,915,331 A | * | 6/1999 | Kimm ..................... | 119/14.08 |
| 5,934,220 A | * | 8/1999 | Hall et al. ................ | 119/14.08 |
| 6,055,930 A | * | 5/2000 | Stein et al. .............. | 119/14.08 |
| 6,167,839 B1 | * | 1/2001 | Isaksson et al. ......... | 119/14.08 |
| 6,363,883 B1 | * | 4/2002 | Birk ........................ | 119/14.08 |

FOREIGN PATENT DOCUMENTS

| | | | |
|---|---|---|---|
| EP | 0 440 313 A2 | 8/1991 | |
| EP | 0 472 247 A2 | 2/1992 | |
| EP | 0 643 907 A2 | 3/1995 | |
| WO | WO 96/01040 | 1/1996 | |
| WO | WO 96/20587 | 7/1996 | |
| WO | WO 97/15900 | * 5/1997 | ............. 119/14.08 |
| WO | WO 98/47348 | 10/1998 | |
| WO | WO 99/33020 | 7/1999 | |

* cited by examiner

Primary Examiner—Peter M. Poon
Assistant Examiner—Elizabeth Shaw
(74) Attorney, Agent, or Firm—Birch, Stewart, Kolasch & Birch, LLP

(57) ABSTRACT

A method for recognizing and determining the position of at least one teat of a milking animal, including the steps: moving a scanning head including a light source to a region containing the teat or teats, capturing at least one image formed by said light, evaluating the image or images so as to determine if each image describes said teat or teats. The scanning head (1) is moved to a fixed initial position (A) in the room which is under the animal and clearly in front of an udder and thereby the teats of all known relevant animals, thereafter the scanning head is moved in determined steps (A–J) under the animal: upwards towards the animal, downwards, backwards towards the udder, upwards, downwards etc., while carrying out the scanning procedure. The invention also concerns an apparatus carrying out the process and a milking robot including such an apparatus.

14 Claims, 2 Drawing Sheets

Figure 1A:
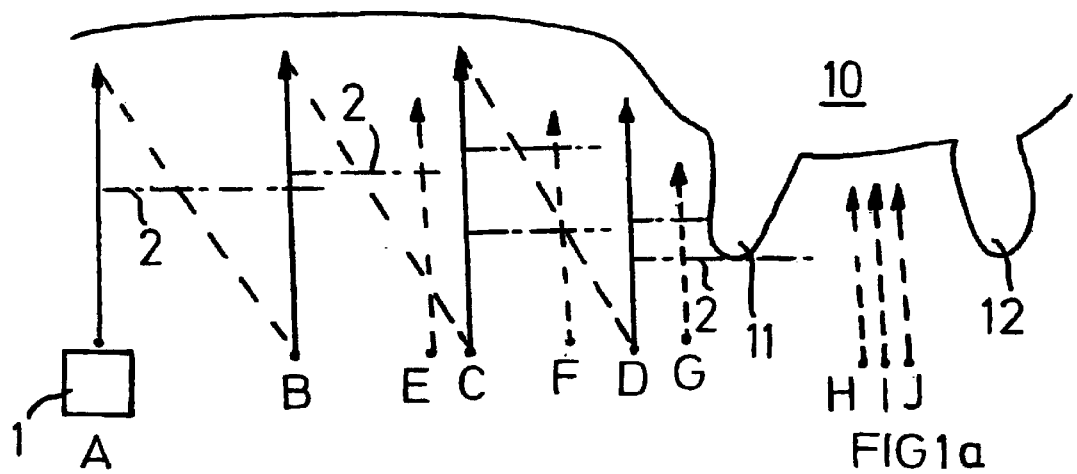

METHOD AND APPARATUS FOR RECOGNIZING AND DETERMINING A POSITION AND ROBOT INCLUDING SUCH AN APPARATUS

This application is the national phase under 35 U.S.C. §371 of PCT International Application No. PCT/SE00/00652 which has an International filing date of May 4, 2001, which designated the United States of America and was published in English.

FIELD OF THE INVENTION

This invention concerns a method and an apparatus for recognising and determining the position of at least one teat of a milking animal in accordance with the preambles of claim 1 and 9 respectively. The invention also concerns a robot including such an apparatus.

PRIOR ART

Such an apparatus is described in WO96/20587. This document concerns solving problems arising from teats of the animal not being in the same position in a subsequent visit as in a previous visit. Such a shift in the position of the teats in particular occurs in case of young animals where the sizes of the udders increase with growths, resulting in greater distances between the teats.

In case of adult animals it has been found that teat positions vary depending on varying milk productivity and time period passing between the visits to the milking robot. In WO96/20587 the actual teat position is constantly checked and the position values are amended on the basis of deviations with respect to previous positions. According to this document, however, the position of the teats of an animal, which is to be milked for the first time, is recorded by the teat cups being moved by hand to the teats of the udder and fixed thereon. The positions are recorded in various memories.

At subsequent milking operations the present images are compared with stored values so as to determine possible changes in position. In the event of such changes, the stored values are replaced with new image values.

The method according to WO96/20587 suffers from the drawback that new animals have to be introduced into the system by manual recording by the farmer of the positions for the teat or teats. This is a time-consuming procedure, which is detrimental for the over all economy of the milk production at the farm. Further, although the prior art system takes account of minor position changes of the teats, it presupposes relatively stable fixing of the animal as much as possible in the same position as the original one in order to be reliable. Major changes of the position of the cow, and in particular of the teats, result in risk of failure to detect the positions of the teats. WO96/20587 speculates in determining the initial position by other methods than the manual method described in that document. The document is however, silent about how to carry out such alternative methods.

SUMMARY OF THE INVENTION

It is an object of the invention to provide a method and an apparatus wherein the said drawbacks are eliminated. This aim is obtained in a method and an apparatus as above through the features of the characterizing portions of claim 1 and 9, respectively.

This way a system is provided, which is capable of taking care of practically all new milking animals with respect to introducing them into the system in an automatic manner, with out the farmer having to manually position the teat cups for teaching the system the positions of the teats. By having an initial position, which is chosen such that all relevant animals can be monitored and by moving the scanning head in steps during scanning and finally comparing the subsequent images with each other instead of only with reference images of the like, a safe and reliable system is created. No pre-information is thus needed in order to find the teats of any cow. The system is therefore "self learning".

The inventive system has the capability of recognising and determining teat positions for practically all relevant milking animals, almost irrespective of where the udder is located on the animal.

By storing the position values from the initial recognition sequence of a respective animal and controlling the scanning head so as to start subsequent recognising operations taking account of the stored information, i.e. in practice closer to the udder, the recognising sequence may be shortened in an advantageous way with respect to later milking operations.

In the event that the teats are not found during such a shortened sequence within a predetermined time period for one reason or the other, the system is preferably adapted to start over again using an initial position according to the above, which is adapted to investigate all new relevant animals.

By updating position values during subsequent recognising sequences, altered teat positions and other changes are dealt with.

The invention also comprises a milking robot including the conventional means for carrying the scanning head, a drive means therefore, teat cup arrangements, means for handling milk and other fluids such as disinfectants, and a control unit capable of controlling the operation of the robot.

BRIEF DESCRIPTION ON THE DRAWINGS

Figure 1B:
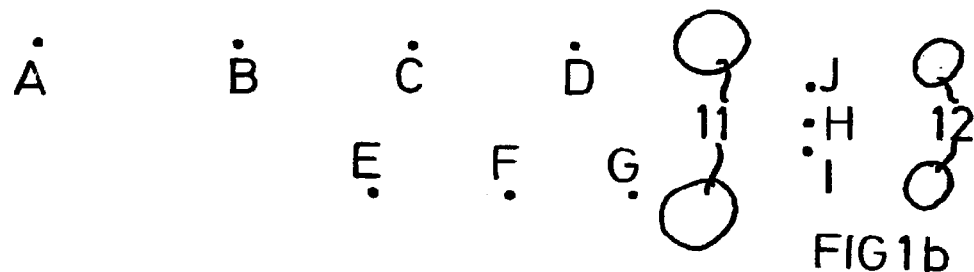
Figure 3:
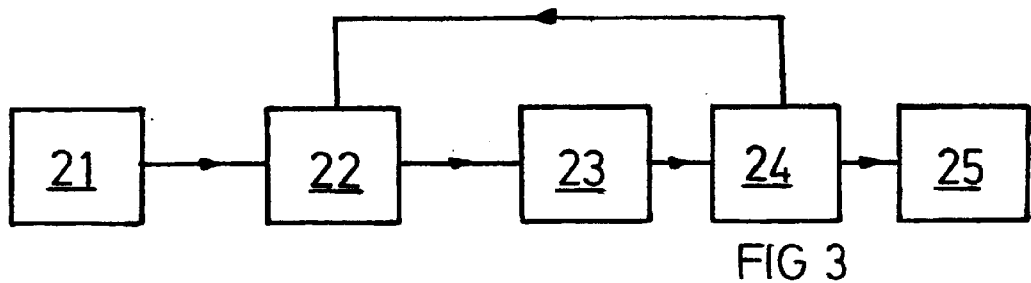
Figure 2A:
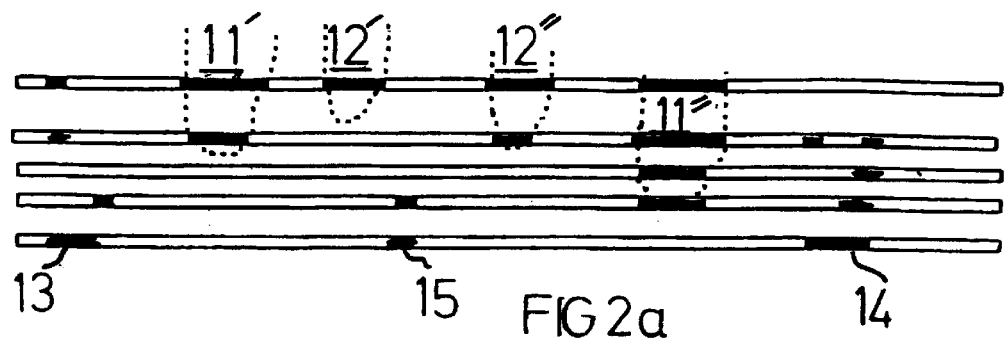
Figure 2B:
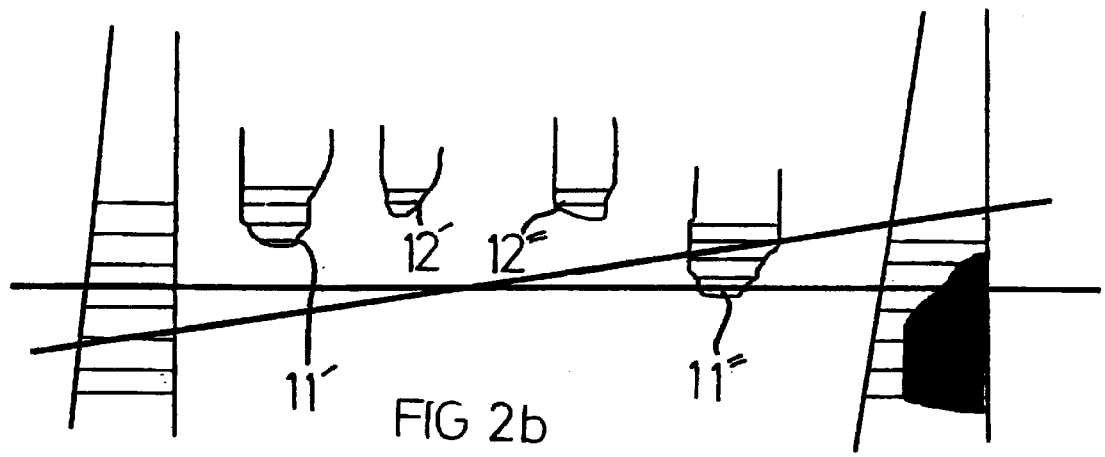
Figure 4:
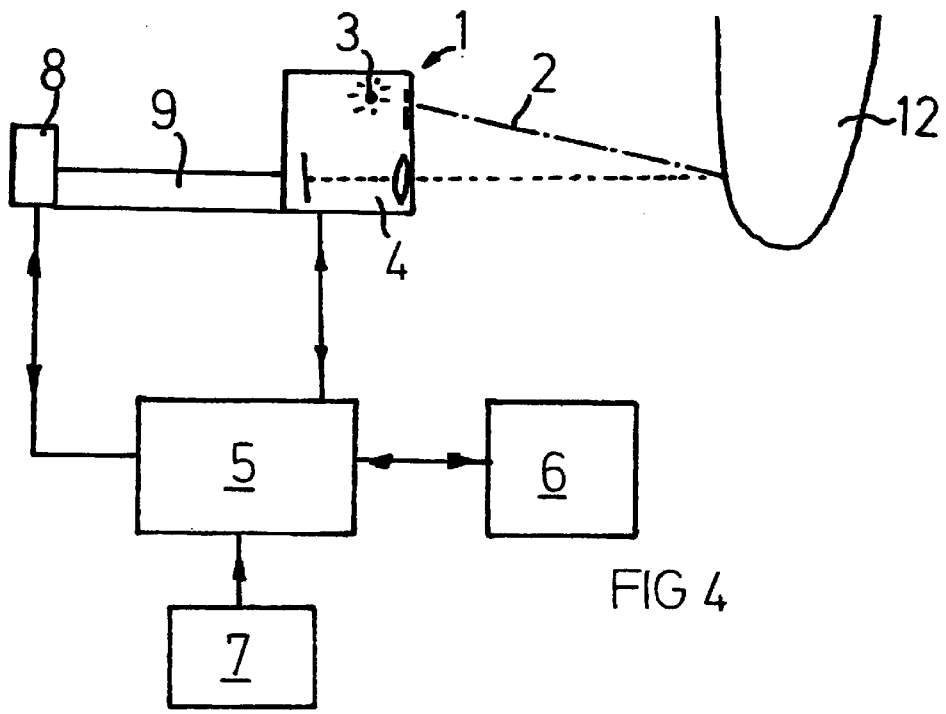

Further advantages are obtained by different aspects of the invention and will be more clearly understood from the following detailed description, wherein an embodiment of the invention is described with reference to the accompanying drawings, wherein:

FIGS. 1a and 1b diagrammatically shows the movement of the scanning head, under a cow, included in a sequence according to the invention, FIG. 2a shows teat representations in the form of discrete captured image lines, whereas FIG. 2b show the underlying "true" image, FIG. 3 shows a flow chart explaining the method according to the invention, and FIG. 4 shows, as a diagram, an apparatus according to the invention.

DETAILED DESCRIPTION OF AN EMBODIMENT

FIG. 1 shows a detail of a cow, which is in a milking position and is about to be introduced into a system according to the invention. In the method according to the invention, as is indicated in FIGS. 1a and 1b, a scanning head 1 is initially moved by a milking robot arm or the like to a fixed position A under the cow. This position A is chosen such that it is safely in front of all udders of all known cows that might be subject to investigation by an apparatus according to the invention.

The scanning head emits a sheet of light 2, preferably laser light, which is in an angular form having an included angle of, as an example, 90°. Inside the scanning head is further included an image capturing means such as a camera, which is arranged below the light source, and is adapted to capture an image of an illuminated teat.

From the initial position A, the scanning head 1 is moved upwards until it touches the cow or in any other way senses that it has reached a position where it is obstructed from further upwards movement. It has, however, to be ensured that the upwards movement is not terminated by pushing the cow in a way that it becomes disturbed.

The sheet of light illuminates objects in its direction during a first scan when moving from a downward position A upwards until contact with the cow is sensed. The scanning head is then moved downwards and backwards (as seen in the direction of the cow) to the position B, from where it is again moved upwards during scanning. This sequence is repeated in steps B, C, D until it has been established that an item, which appear to be a teat or teats has or have been detected. In step D the lower tip of the teat 11, the front right teat, is illuminated by the laser source and accordingly is captured by the camera as a line. The scanning head thus is moved in further steps backwards so as to allow the system to evaluate that the item is in deed a teat. This is achieved by comparing images obtained in plural subsequent steps for determining the three-dimensional position in space and by comparing with stored information with respect to the appearance of a teat (for example distinguished from the legs or the tail). Further, the position of the first teat (in this case the front right teat) is completely recognised, so as to allow subsequent positioning of a teat cup on this teat.

From the position where the scanning head has detected the front right teat, it is moved sideways and then, in a further stepwise manner, backwards, so as to locate the front left teat. Thereafter it will move in steps H, I, J in order to recognise the rest of the teats. It goes without saying that movements in the region near and under the udder are made with great care not to disturb the animal.

It is possible to scan in chosen step positions or alternatively during movement of the scanning head.

The results from the scanning sequence is stored in a memory and linked to the specific cow, which in a known manner is identified by for example a readable identification tag. This allows the sequence for subsequent visits to the milking location of this specific cow to be shortened and be carried out starting from for example a position between C and D allowing shorter scanning time.

FIG. 2*a* shows the captured teats in the form of discrete captured image lines. More specifically, this figure comprises five images obtained in one scan. Each scan may generate 1–n pictures. By comparing the images and the stored information, the system is capable of determining that the (here black) image lines included inside the teat images (indicated with dotted lines 11', 11", 12', 12") are in deed describing teats having lower extreme points, whereas lines 13 and 14 relate to legs without such lower extreme points and 15 to the tail. Compare with FIG. 2*b*, which shows the "real image" behind FIG. 2*a*.

In the flow chart in FIG. 3: 21 concerns moving a scanning head including a light source to a fixed initial position in the room which is under the animal and clearly in front of an udder and thereby the teats of all known relevant animals. 22 concerns scanning backwards and moving the scanning head upwards towards the animal while carrying out the scanning procedure including emitting at least one bundle of light from said light source into said region so as to illuminate the teat or teats. 23 concerns capturing at least one image formed by said light. 24 concerns evaluating the image or images so as to determine if each image describes the teat or teats by comparing the image obtained during one step with corresponding images obtained in previous step or steps until the position of at least a first teat has been established.

The sequence 22–24 is repeated until it has been established that said teat or teats is described by the image or images, determining the position of the teat or teats. The same or slightly modified sequence is utilised to detect also the rest of the teats. Then in 25, a signal is provided for guiding teat cups to the determined positions.

The apparatus in FIG. 4 includes a scanning head comprising a light source such as a laser 3 being arranged to emit a sheet shaped bundle of light 2, which is directed substantially horizontally. Inside the scanning head there is also provided an image-capturing camera 4.

A control unit 5 receives the image signals from the camera and is also adapted to control the operation of the light source and of the camera. The control unit 5 receives data from a memory 6, and is also adapted to update the information, which is stored in the memory 6.

The control unit also communicates with an animal identity detector 7, which is arranged to detect information relating to the specific animal, when it enters the milking area. This information used to collect the relevant data from the memory so as to allow the control unit to use the adequate scanning sequence with respect to the cow to be milked. In particular, the data concerned is the data obtained in the initial recognition sequence which is used during subsequent milking operations. However, preferably the data are updated continuously so as to deal with altered udder configurations occurring at instances, more or less for all cows.

Further, the control unit controls the movement of the scanning head by transmitting signals to a drive mechanism 8, which is arranged to move a robot arm 9, which in turn carries the scanning head 1.

The method and the apparatus may be modified within the scope of the claims. Thus, the light source and camera arrangement may be different, i.e. the nature of the light and the type of camera. Also the mechanism for moving the scanning head may be different. The steps may be longer at the beginning of the scanning sequence and shorter closer to the udder.

The arrangement for recognising the upper position of the scanning head and immediately stopping it when it touches the animal may be a sensor on the head itself or a sensor related to the carrier arm or to the drive mechanism.

What is claimed is:

1. A method for recognizing and determining the position of a teat or teats of a milking animal, including the steps:

moving a scanning head (1) including a light source (3) to a region (A) containing the teat or teats (11, 12), emitting at least one bundle of light (2) from said light source into said region so as to illuminate said teat or teats, capturing at least one image formed by said light, evaluating the image or images so as to determine if each image describes said teat or teats, in the event that it is established that said teat or teats is described by the image or images, determining the position of said teat or teats and providing signal information for guiding a teat cup to that position, moving the scanning head to a fixed initial position (A) in the room which is under the animal and clearly in front of an udder (10) and thereby the teats (11, 12) of all known relevant animals, scanning backwards and moving the scanning head in determined steps (A–J) under the animal: upwards towards the animal, downwards, backwards towards the udder, upwards, downwards, while carrying out the scanning procedure, wherein the evaluating step includes comparing the images obtained during one step with corresponding images obtained in a previous step or steps, and repeating the scanning and evaluating steps until the position of at least a first teat has been established, wherein the obtained position values are stored and related to the investigated animal and wherein before subsequent recognizing operations with respect to that animal, the scanning head (1) starts from a position taking account of the stored information.

2. A method according to claim 1, wherein the bundle of light (2) is directed substantially horizontally.

3. A method according to claim 1, wherein the position of each subsequent teat is determined by using the already established position for each first teat or teats.

4. A method according to claim 1, wherein the light source (2) is a laser source.

5. A method according to claim 1, wherein the position values are updated during subsequent recognizing operations.

6. A method according to claim 1, wherein, in the event that the teat or teats are not found during a shortened sequence within a predetermined time period, the scanning head is moved to the initial position (A) for performing a complete scanning sequence.

7. A method according to claim 1, wherein the different images are compared with respect to the presence of items having a lower extreme point at the same horizontal level on two or more images.

8. An apparatus for recognizing and determining the position of a teat or teats of a milking animal, including:

a scanning head (1) including a light source (3) for emitting at least one bundle of light (2) into a region which is expected to contain the teat or teats (11, 12), means for capturing at least one image formed by said light, means for evaluating the image or images so as to determine if each image describes said teat or teats, means for determining the position of said teat or teats in the event that it is established that said teat or teats is described by the image or images, and means for providing signal information for guiding a teat cup to that position, wherein:

the scanning head (1) is arranged to be moved to a fixed initial position (A) in the room which is under the animal and clearly in front of an udder (10) and thereby the teats (11, 12) of all known relevant animals, the scanning head (1) is arranged for scanning backwards and in determined steps under the animal: upwards towards the animal, downwards, backwards towards the udder, upwards, downwards etc. (A–J), while carrying out the scanning procedure, wherein means are arranged for comparing the images obtained during one step with corresponding images obtained in a previous step or steps, and repeating the scanning and evaluating steps until the position of at least a first teat has been established, wherein a memory (6) is arranged to store the obtained position values and relate them to the investigated animal, and wherein the scanning head is arranged to start from a position taking account of the stored information from previous recognizing operations with respect to that animal.

9. An apparatus according to claim 8, wherein the scanning head (1) is arranged to direct the bundle of light substantially horizontally.

10. An apparatus according to claim 8, wherein the light source (3) us a laser source.

11. An apparatus according to claim 8, wherein the memory (6) is arranged to update the position values during subsequent recognizing operation.

12. An apparatus according to claim 8, characterized in means for moving the scanning head to the initial position (A) for performing a complete scanning sequence in the event that the teat or teats are not found during a shortened sequence within a predetermined time period.

13. An apparatus according to claim 8, wherein means are arranged for comparing the different images with respect to the presence of items having a lower extreme point.

14. A milking robot comprising:

an apparatus for recognizing and determining the position of a teat or teats of a milking animal, including:

a scanning head (1) including a light source (3) for emitting at least one bundle of light (2) into a region which is expected to contain the teat or teats (11, 12), means for capturing at least one image formed by said light, means for evaluating the image or images so as to determine if each image describes said teat or teats, means for determining the position of said teat or teats in the event that it is established that said teat or teats is described by the image or images, and means for providing signal information for guiding a teat cup to that position, wherein:

the scanning head (1) is arranged to be moved to a fixed initial position (A) in the room which is under the animal and clearly in front of an udder (10) and thereby the teats (11, 12) of all known relevant animals, the scanning head (1) is arranged for scanning backwards and in determined steps under the animal: upwards towards the animal, downwards, backwards towards the udder, upwards, downwards etc. (A–J), while carrying out the scanning procedure, wherein means are arranged for comparing the images obtained during one step with corresponding images obtained in a previous step or steps, and repeating the scanning and evaluating steps until the position of at least a first teat has been established, wherein a memory (6) is arranged to store the obtained position values and relate them to the investigated animal, and wherein the scanning head is arranged to start from a position taking account of the stored information from previous recognizing operations with respect to that animal.

* * * * *